Jan. 8, 1935.  E. ZIMMER  1,987,316
YIELDABLE DRIVE SHAFT
Filed Sept. 7, 1933
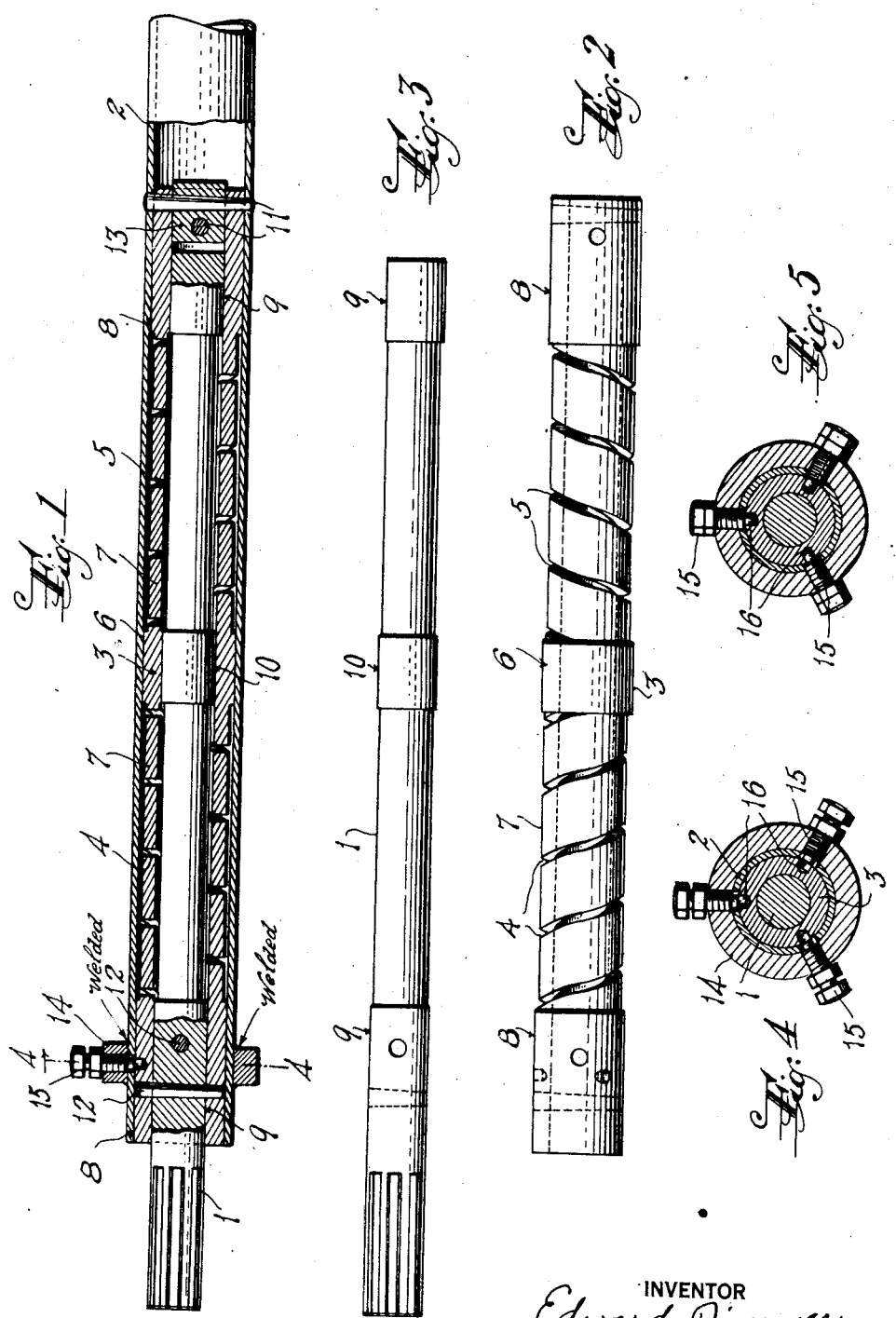
INVENTOR
Edward Zimmer,
BY
Harry S. Cook.
ATTORNEY Patented Jan. 8, 1935

1,987,316

UNITED STATES PATENT OFFICE 1,987,316

YIELDABLE DRIVE SHAFT

Edward Zimmer, Newark, N. J.

Application September 7, 1933, Serial No. 688,439

7 Claims. (Cl. 64—29)

This invention relates to a drive shaft to be connected between a driving element and a driven element for the purpose of reducing the strains, especially torque strains, upon one or the other of said elements, for example the strains which result from variation in application of power by the driving element to the driven element, or from variation in resistance applied by the driven element against the driving element; and more particularly, this invention is directed to a drive or propeller shaft for automobiles for transmitting power from the engine to the rear or driving wheels.

It has been proposed to form a drive shaft in two sections and connect them by a yieldable coupling, such as a torque spring, for absorbing or compensating shocks or strains set up in the drive shaft between the driving element and the driven element, but known structures of this character have been unsatisfactory, either because they have been structurally incapable of withstanding the strains which the drive shafts have been designed to transmit, or because the structures have been impractical or too costly to manufacture.

Among the objects of my invention are the provision of a yieldable drive shaft of the general character described which shall embody novel and improved features of construction whereby the drive shaft shall be capable of withstanding heavy strains and hard usage; and the provision of such a drive shaft which shall be simple and inexpensive in construction and reliable in operation.

Further objects are to provide a drive shaft of this character including a novel and improved torsional spring coupling element formed of a single piece of helically slotted tubing, wherein the convolutions of the spring shall be rectangular in cross-section with the larger dimension parallel to the axis of the spring and be capable of withstanding heavy torque strains; and the provision of such a drive shaft including a spring element having two helical spring sections, one having a left-hand helix and the other a right-hand helix, whereby, as torque strains are imposed on the element, one section is wound or contracted diametrically, while the other section is unwound or expanded diametrically, to provide balance of the strains in the spring element so that it may withstand heavy strains, and so that longitudinal contraction and extension of each spring section is compensated by the other, one section extending as the other contracts, which is especially desirable where the direction of rotation of the shaft is frequently reversed as in automobile propeller shafts.

Another object is to provide a drive shaft of the character described which shall include two sections and a spring element in telescoping relation, with the spring element between said sections, portions of said spring element having rigid bearing surfaces spaced longitudinally thereof and nicely contacting with said shaft sections to provide a firm support of said spring element against excessive distortion under torsional strains.

Additional objects are to provide such a drive shaft including two telescoping sections and novel and improved means for connecting said sections through a helical torsional spring element, whereby said spring element shall be free to expand and contract both diametrically and longitudinally; to provide such a structure including novel and improved means for directly connecting said shaft sections together when desired, as in case of rupture or weakening of said spring coupling element, whereby the drive shaft may transmit power with or without said coupling element, to avoid, for example, complete disablement of an automobile having such a drive shaft, by breaking of the spring coupling element; and to obtain other advantages and results as will be brought out by the following description.

Referring to the accompanying drawing, in which corresponding and like parts are designated throughout the several views by the same reference characters, Figure 1 is a vertical, longitudinal sectional view, partially in elevation, through a drive shaft embodying my invention.

Figure 2 is a detached side elevation of the spring coupling element.

Figure 3 is a detached side elevation of one of the drive shaft sections.

Figure 4 is a transverse, vertical, sectional view on the line 4—4 of Figure 1, showing the means for directly connecting the two drive shaft sections with said means in inoperative position; and Figure 5 is a similar view showing the means in position for directly connecting the two drive shaft sections.

Specifically describing the illustrated embodiment of the invention, the drive shaft comprises two sections 1 and 2 which are adapted to be connected, respectively, to a driving element and a driven element. For example, the section 1 may be connected to the transmission gearing of an automobile, while the section 2 may be connected to the differential for driving the rear wheels.

One of the sections, in the present instance section 2, is shown as tubular, while the other section is a solid rod or shaft, and the two sections are arranged in co-axial, telescoping relation to each other. Between the two shaft sections, and in co-axial relation thereto, is disposed a spring coupling element 3. As shown this coupling element preferably comprises a tube having two helical slots 4 and 5, the adjacent ends of which are spaced apart as indicated at 6, while the other ends terminate short of the respective ends of the tube. The slots 4 and 5 form two spring sections and preferably the slots are so formed that the convolutions 7 of the spring sections are rectangular in cross-section, with the longer dimension parallel with the axis of the tube. It is also desirable that the helixes of the spring sections formed by the slots 4 and 5 be respectively right-hand and left-hand.

The ends of the coupler 3 have rigid exterior bearing surfaces 8 to nicely contact with the interior walls of the tubular shaft section 2, and the portion 6 of the coupler between the spring sections is also preferably rigid and of a size to nicely contact with the interior wall of the shaft section 2. Similarly, the interior walls of the coupler at and intermediate its ends are formed to nicely receive and contact with the inner shaft section 1 as indicated at 9 and 10 respectively. The spring coupler is thereby firmly supported between the shaft sections by the rigid bearing surfaces 6, 8, 9, and 10. The convolutions of the spring sections have an exterior diameter less than the interior diameter of the outer tubular shaft section 2, and said convolutions have an interior diameter greater than the diameter of the inner shaft section 1, so as to provide a clearance for diametrical expansion and contraction of the convolutions when the spring coupler is placed under torsional strain.

One end of the spring coupler is connected to each drive shaft section 1 and 2, and as shown, the inner end of the spring coupler is connected to the tubular shaft section by transverse pins 11 which pass through both the shaft section and the coupler, while the outer end of the coupler is connected to the inner shaft section 1 by similar pins 12 which pass through the coupler and said inner shaft section. Preferably, a filler block 13 is inserted into the inner end of the spring coupler to reenforce the connection of the coupler to the tubular shaft section.

In operation of the drive shaft, with the shaft sections connected respectively to a driving element and a driven element, power is transmitted from the driving section of the shaft through the spring coupler to the driven section, and torsional strains are imposed upon the spring coupler tending to simultaneously diametrically contract the convolutions of one spring section and diametrically expand the convolutions of the other, whereby variations in application of power by the driving element to the driven element, or variations in resistance applied by the driven element against the driving element will be absorbed by the spring coupler to prevent shocks and jars and reduce the severity of the strains imposed upon the driving element and the driven element.

The two spring sections will in effect balance each other by the simultaneous diametrical contraction of one and diametrical expansion of the other, and the firm support of the spring coupler by and between the shaft sections through the bearing surfaces 6, 8, 9 and 10, will prevent excessive lateral distortion of the coupler under torsional strains. The coupler is free to extend or contract longitudinally due to the sliding relation of the coupler to the two shaft sections, and of course the spring sections will also absorb longitudinal strains imposed upon the shaft by relative movement of the sections.

In some cases, it may be desirable to directly connect the two shaft sections together, for example, should the spring coupler become broken or weakened, so as to enable power to be transmitted by the drive shaft even without the coupler in operation. For this purpose I have shown a collar 14 welded or otherwise rigidly secured to the outer shaft section 2, and a plurality of set screws 15 threaded in said collar to cooperate with recesses 16 in the corresponding end of the coupler which is directly connected to the inner shaft section. During normal operation of the drive shaft, with the spring coupler functioning, the set screws 15 are withdrawn from the recesses 16 as shown in Figure 4, but when it is desired to directly connect the two shaft sections, the set screws are screwed into the recesses 16 as shown in Figure 5.

It will be observed that a drive shaft constructed in accordance with my invention will be capable of withstanding heavy strains and hard use, and yet the structure is simple and inexpensive. While I have shown and described the invention as embodying certain details of construction, it should be understood that many modifications and changes may be made in the construction of the drive shaft without departing from the spirit or scope of the invention, and therefore I do not desire to be understood as limiting myself except as required by the following claims when construed in the light of the prior art.

Having thus described my invention, what I claim is:

1. A yieldable drive shaft, comprising two axially alined shaft sections, and a spring coupler including two axially alined helical spring sections arranged end to end and having right-hand and left-hand helixes respectively arranged co-axially with said shaft sections, one end of each spring section being connected to one end of the other spring section, and the other ends of said spring sections being connected to said shaft sections respectively.

2. A yieldable drive shaft, comprising two axially alined shaft sections and a helical spring coupler arranged in co-axial telescoping relation with said spring coupler interposed between said shaft sections, said spring coupler having rigid bearing surfaces at and between its ends nicely contacting with the respective shaft sections to support said spring coupler against lateral distortion under torsional strains, and means rigidly connecting the ends of said coupler to said shaft sections respectively.

3. A yieldable drive shaft, comprising two axially alined shaft sections and a helical spring coupler arranged in co-axial telescoping relation with said spring coupler interposed between said shaft sections, said spring coupler consisting of a tube having a helical slot terminating short of its ends and having integral rigid bearing surfaces at and between its ends nicely contacting with the respective shaft sections to support said spring coupler against lateral distortion under torsional strains, and means rigidly connecting the ends of said coupler to said shaft sections respectively.

4. The yieldable drive shaft set forth in claim 2 wherein said spring coupler includes two co-axial spring sections having respectively right-hand and left-hand helixes.

5. A yieldable drive shaft, comprising two axially alined shaft sections and a helical spring coupler arranged in co-axial telescoping relation with said spring coupler interposed between said shaft sections, said spring coupler consisting of a tube having two helical slots spaced longitudinally of said tube and having rigid bearing surfaces at and between the ends of said slots nicely contacting with the respective shaft sections to support said spring coupler against lateral distortion under torsional strains, and means rigidly connecting the ends of said coupler to said shaft sections respectively.

6. The yieldable drive shaft set forth in claim 5 wherein said helical slots are respectively right-hand and left-hand.

7. The yieldable drive shaft set forth in claim 2 with the addition of means for directly and rigidly connecting said shaft sections together independently of said spring coupler.

EDWARD ZIMMER.